US008265330B2

(12) United States Patent
Fukunishi et al.

(10) Patent No.: US 8,265,330 B2
(45) Date of Patent: Sep. 11, 2012

(54) MATERIAL FOR SPEAKER DEVICE AND SPEAKER DEVICE USING IT

(75) Inventors: Yoshiharu Fukunishi, Bizen (JP); Takanori Kitamura, Bizen (JP); Kengo Tabata, Osaka (JP); Toshiyuki Matsumura, Kadoma (JP); Shuji Saiki, Kadoma (JP); Yoshimichi Kajihara, Kadoma (JP); Satoshi Koura, Kadoma (JP)

(73) Assignees: Kuraray Chemical Co., Ltd., Bizen-shi (JP); Panasonic Corporation, Kadoma-shi (JP)

( * ) Notice: Subject to any disclaimer, the term of this patent is extended or adjusted under 35 U.S.C. 154(b) by 685 days.

(21) Appl. No.: 12/442,134

(22) PCT Filed: Jul. 4, 2008

(86) PCT No.: PCT/JP2008/062542

§ 371 (c)(1),
(2), (4) Date: Mar. 20, 2009

(87) PCT Pub. No.: WO2009/014015

PCT Pub. Date: Jan. 29, 2009

(65) Prior Publication Data

US 2010/0074463 A1 Mar. 25, 2010

(30) Foreign Application Priority Data

Jul. 20, 2007 (JP) ................................ 2007-189638
Jul. 20, 2007 (JP) ................................ 2007-189639

(51) Int. Cl.
*H04R 1/02* (2006.01)
*C01B 31/08* (2006.01)

(52) U.S. Cl. ........................................ 381/386; 423/455

(58) Field of Classification Search ................... 381/386
See application file for complete search history.

(56) References Cited

U.S. PATENT DOCUMENTS

2004/0251077 A1* 12/2004 Wright et al. ................ 181/151
(Continued)

FOREIGN PATENT DOCUMENTS

GB 2 391 224 A 2/2004
(Continued)

OTHER PUBLICATIONS

Yinzhi Zhang, Zhong Tang, M. Mercedes Maroto-Valer and John M. Andrésen,Development of Microporous Activated Carbons from Unburned Carbon in Fly Ash,Fuel Chemistry Division Preprints 2003, 48(1), 65.*
(Continued)

*Primary Examiner* — Zandra Smith
*Assistant Examiner* — Lawrence Tynes, Jr.
(74) *Attorney, Agent, or Firm* — Oblon, Spivak, McClelland, Maier & Neustadt, L.L.P.

(57) ABSTRACT

A material for improving the sound pressure level at the bass reproduction limit of the present invention is composed of an activated carbon having a cumulative pore volume of 0.4 ml/g or more for the pores each having a radius of 50 angstroms or less. Preferably, this activated carbon has a cumulative pore volume of 0.1 ml/g or less for the pores each having a radius of 7 angstroms or less. In particular, when a sound pressure level improving material in which the activated carbon has a cumulative pore volume of 0.5 ml/g or more for the pores each having a radius of 18 angstroms or less is installed in a cabinet of a loudspeaker device, the material alleviates pressure fluctuations of a gas within the cabinet caused by vibration of a loudspeaker, and thus a very good bass reproduction effect is attained. Moreover, in the case where a sound pressure level improving material in which the activated carbon has a cumulative pore volume of 0.4 ml/g or more for the pores each having a radius of 18 to 50 angstroms is installed in the cabinet, a loudspeaker device having a good bass reproduction effect even in an atmosphere of high humidity is obtained.

8 Claims, 10 Drawing Sheets

U.S. PATENT DOCUMENTS

| | | | |
|---|---|---|---|
| 2008/0170737 | A1 | 7/2008 | Saiki et al. |
| 2009/0038477 | A1 | 2/2009 | Abe et al. |

FOREIGN PATENT DOCUMENTS

| | | | |
|---|---|---|---|
| JP | 1-226296 | | 9/1989 |
| JP | 6-99065 | | 4/1994 |
| JP | 2005-903 | | 1/2005 |
| JP | 2006-60418 | | 3/2006 |
| JP | 2006-63859 | | 3/2006 |
| JP | 2006-101031 | | 4/2006 |
| WO | WO 84/03600 | | 9/1984 |
| WO | WO 03/013183 | A2 | 2/2003 |
| WO | WO 03/101147 | A1 | 12/2003 |
| WO | 2006 104103 | | 10/2006 |

OTHER PUBLICATIONS

P. M. Satya Sai,K. Krishnaiah,Development of the Pore-Size Distribution in Activated Carbon Produced from Coconut Shell Char in a Fluidized-Bed Reactor,Ind. Eng. Chem. Res. 2005, 44, 51-60.*

* cited by examiner

MATERIAL FOR SPEAKER DEVICE AND SPEAKER DEVICE USING IT

TECHNICAL FIELD

The present invention relates to a material for improving the sound pressure level at the bass reproduction limit for use in a loudspeaker device, the material being capable of effectively realizing bass reproduction in a small loudspeaker device, and a loudspeaker device using the same.

BACKGROUND ART

Generally, in small loudspeaker devices, bass reproduction is difficult due to the influence of acoustic stiffness, because the volume of a loudspeaker cabinet is small. In other words, when an electric signal is applied to a loudspeaker, the air within the cabinet is compressed due to vibration of the loudspeaker and the compressed air acts as an air spring and interferes with the movement of the loudspeaker, resulting in a decrease in the sound pressure level, particularly in a bass range. Thus, sufficient bass reproduction cannot be achieved. In order to realize bass reproduction in small loudspeaker devices, there has been proposed a loudspeaker device in which a gas adsorbent material such as activated carbon is disposed in the interior of the cabinet (WO 84/03600, for example).

The loudspeaker device disclosed in WO 84/03600 is composed of: a loudspeaker cabinet; a loudspeaker attached to one face of the cabinet so that a rear portion thereof is in communication with the interior of the cabinet; a gas contained within the cabinet; and a gas adsorbent material such as activated carbon disposed in the cabinet. When an electric signal is applied to the loudspeaker, the gas within the cabinet is rapidly compressed and expanded due to vibration of the loudspeaker. Accordingly, molecules of the gas are adsorbed into and desorbed from the above-described activated carbon. Therefore, pressure fluctuations in the interior of the cabinet are suppressed. As a result, according to the disclosure of WO 84/03600, the sound pressure level in the low frequency range is not decreased, and an effect equal to that in the case where a cabinet having a large capacity is used is attained.

Desirably, the gas adsorbent material, for example, activated carbon, has a low moisture content. The reason for this is that if an activated carbon on which moisture is adsorbed is installed in the cabinet, the activated carbon will show an insufficient ability to adsorb the gas molecules even when the gas within the cabinet is compressed due to vibration of the loudspeaker. Thus, WO 84/03600 above employs a complicated configuration in which a moisture impermeable partition (diaphragm) is located within the cabinet between the loudspeaker and the gas adsorbent material such as activated carbon.

WO 03/013183 discloses the use of an adsorbent material that has been treated to render it at least partially hydrophobic as the gas adsorbent material installed in the cabinet so that the adsorbent material is unlikely to adsorb moisture even in an atmosphere of high humidity. For example, an activated carbon that has been treated by reaction with a silicon-containing compound so as to be hydrophobic is disclosed. GB 2391224A discloses an activated carbon that has been treated so as to be hydrophobic and that can be used as such a gas adsorbent material. Although such a material can be used even in an atmosphere of relatively high humidity, a complicated step of treating the material to render it hydrophobic is required.

WO 03/101147 discloses a loudspeaker assembly in which an activated carbon is installed in a cabinet and the cabinet is purged with a high concentration of dry carbon dioxide gas. The loudspeaker assembly further includes a sensing means for sensing the concentration of carbon dioxide within the cabinet, a means for supplying carbon dioxide, and a means for controlling the supply of carbon dioxide. However, even in this loudspeaker assembly, a complicated means for maintaining the humidity at a low level is required.

Accordingly, there exists a demand for a means for improving bass reproduction in the loudspeaker devices, in particular, for a further improvement of the gas adsorbent material such as activated carbon.

DISCLOSURE OF INVENTION

The present invention has been conceived to address the conventional problems described above, and it is an object thereof to provide a material for improving the sound pressure level at the bass reproduction limit for use in a loudspeaker device, the material being capable of further effectively realizing bass reproduction in a small loudspeaker device, and a loudspeaker device using the same.

The inventors of the present invention found that when an activated carbon which has a cumulative volume of 0.4 ml/g or more for the pores each having not greater than a predetermined pore size is installed in a cabinet of the loudspeaker device, a sufficient gas-adsorbing effect is attained during vibration of a loudspeaker, and consequently, bass reproduction is realized further effectively. The present invention was thus achieved.

The present invention provides a material for improving the sound pressure level at the bass reproduction limit, the material being composed of an activated carbon, wherein the activated carbon has a cumulative pore volume of 0.4 ml/g or more for the pores each having a radius of 50 angstroms or less.

The present invention also provides a loudspeaker device including a cabinet, a loudspeaker unit attached to the cabinet, and a material for improving the sound pressure level at the bass reproduction limit disposed in an empty chamber in the interior of the cabinet, wherein the material for improving the sound pressure level is composed of an activated carbon having a cumulative pore volume of 0.4 ml/g or more for the pores each having a radius of 50 angstroms or less.

In an embodiment, the activated carbon has a cumulative pore volume of 0.1 ml/g or less for the pores each having a radius of 7 angstroms or less.

In an embodiment, the activated carbon has a cumulative pore volume of 0.5 ml/g or more for the pores each having a radius of 18 angstroms or less.

In another embodiment, the activated carbon has a cumulative pore volume of 0.4 ml/g or more for the pores each having a radius of 18 to 50 angstroms.

In still another embodiment, the activated carbon has a cumulative pore volume of 0.5 ml/g or more for the pores each having a radius of 18 to 50 angstroms.

When the material for improving the sound pressure level at the bass reproduction limit of the present invention is installed in the cabinet of the loudspeaker device, the material alleviates pressure fluctuations of a gas within the cabinet caused by vibration of the loudspeaker, and thus a good bass reproduction effect is attained.

In particular, when a material for improving the sound pressure level at the bass reproduction limit in which the activated carbon has a cumulative pore volume of 0.5 ml/g or more for the pores each having a radius of 18 angstroms or less is installed in the cabinet of the loudspeaker device, a very good bass reproduction effect is attained, and an acoustic effect equal to that in the case where a cabinet having a large capacity is used is attained even in small loudspeaker devices.

On the other hand, a material for improving the sound pressure level at the bass reproduction limit in which the activated carbon has a cumulative pore volume of 0.4 ml/g or more for the pores each having a radius of 18 to 50 angstroms is unlikely to adsorb moisture even in an atmosphere of relatively high humidity. Thus, when this material for improving the sound pressure level at the bass reproduction limit is installed in the cabinet of the loudspeaker device, the material can easily adsorb and desorb the gas within the cabinet even in an atmosphere of relatively high humidity, and as a result, a sufficient bass reproduction effect is attained even in an atmosphere of high humidity.

BEST MODE FOR CARRYING OUT THE INVENTION

Figure 1:
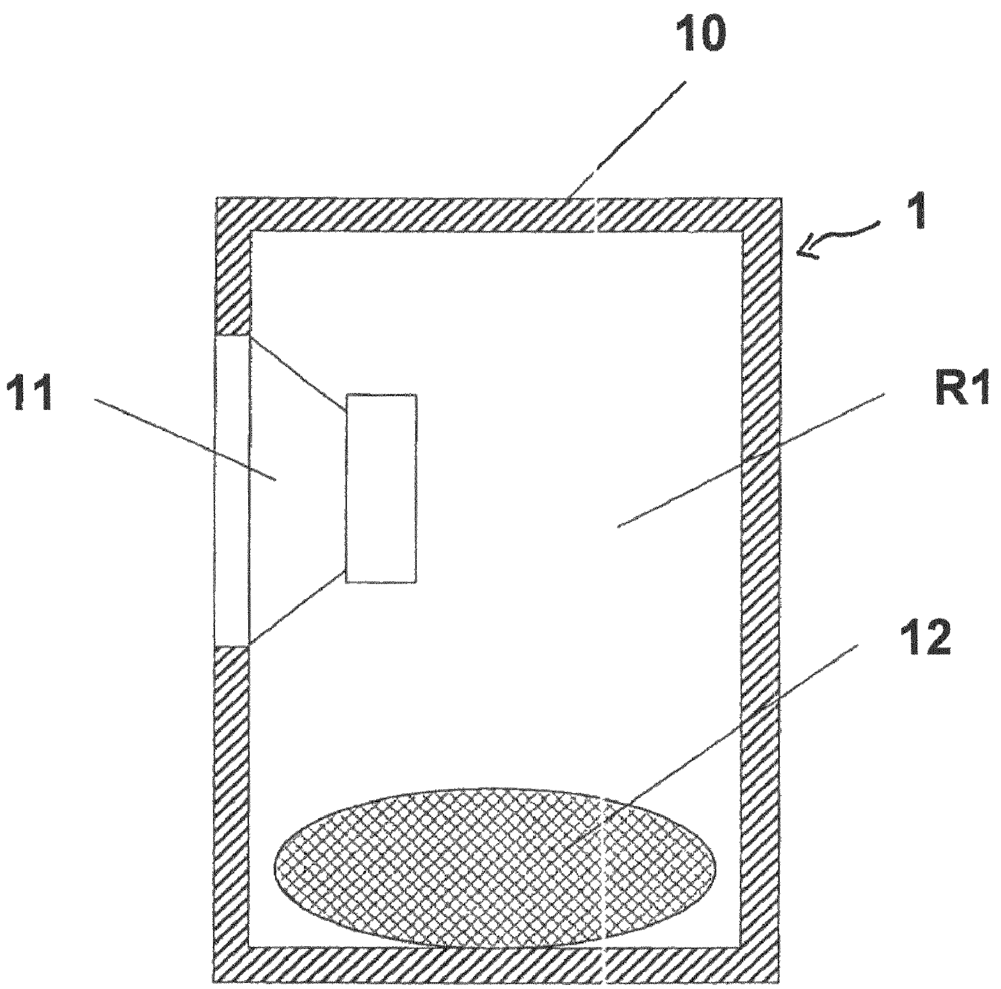
FIG. 1 is a schematic cross-sectional view showing an embodiment of a loudspeaker device using a material for improving the sound pressure level at the bass reproduction limit of the present invention.

(A) Material for Improving the Sound Pressure Level at the Bass Reproduction Limit The material for improving the sound pressure level at the bass reproduction limit of the present invention (hereinafter simply referred to as the "sound pressure level improving material") is composed of an activated carbon which has a cumulative pore volume of 0.4 ml/g or more for the pores each having a radius of 50 angstroms or less. Preferably, the activated carbon has a cumulative pore volume of 0.1 ml/g or less for the pores each having a radius of 7 angstroms or less.

When the above-described cumulative pore volume for the pores each having a radius of 50 angstroms or less is less than 0.4 ml/g, gas molecules within a loudspeaker cabinet cannot be sufficiently adsorbed, and thus in the resultant loudspeaker device, the decreased sound pressure level in the bass range cannot be sufficiently recovered. When the cumulative pore volume for the pores each having a radius of 7 angstroms or less in the activated carbon is more than 0.1 ml/g, in some cases, the decreased sound pressure level in the bass range cannot be sufficiently recovered in the resultant loudspeaker device.

In particular, in order to further effectively realize bass reproduction in small loudspeaker devices, the sound pressure level improving material of the present invention is preferably composed of an activated carbon which has a cumulative pore volume of 0.5 ml/g or more for the pores each having a radius of 18 angstroms or less. More preferably, the cumulative pore volume for the pores each having a radius of 18 angstroms or less is 0.6 ml/g or more. More preferably, the activated carbon has a cumulative pore volume of 0.1 ml/g or less for the pores each having a radius of 7 angstroms or less. The cumulative pore volume for the pores each having a radius of 18 angstroms or more in the activated carbon is preferably 0.2 ml/g or less and more preferably 0.1 ml/g or less.

In this case, when the above-described cumulative pore volume for the pores each having a radius of 18 angstroms or less is less than 0.5 ml/g, adsorption of the gas molecules within the loudspeaker cabinet is not sufficient, and thus, in some cases, the decreased sound pressure level in the bass range cannot be sufficiently recovered in the resultant loudspeaker device. In the case where the cumulative pore volume for the pores each having a radius of 7 angstroms or less in the activated carbon is 0.1 ml/g or more, or in the case where the cumulative pore volume for the pores each having a radius of 18 angstroms or more exceeds 0.2 ml/g, in some cases, the decreased sound pressure level in the bass range cannot be sufficiently recovered in the resultant loudspeaker device.

On the other hand, in order to further effectively realize bass reproduction in an atmosphere of relatively high humidity, the activated carbon used as the sound pressure level improving material of the present invention preferably has a cumulative pore volume of 0.4 ml/g or more for the pores each having a radius ranging from 18 to 50 angstroms. More preferably, the cumulative pore volume for this range is 0.5 ml/g or more. An activated carbon having such pore size characteristics is resistant to moisture. An activated carbon being "resistant to moisture" as referred to herein means that after the activated carbon is left in an atmosphere at a temperature of 30° C. and a relative humidity of 70% for 48 hours, the amount of water adsorbed per g of the activated carbon is 200 mg or less. Preferably, the amount of water adsorbed is 100 mg or less.

Accordingly, when such an activated carbon is installed in the cabinet of the above-described loudspeaker device, the activated carbon adsorbs only a small amount of water even in an atmosphere of relatively high humidity. Thus, adsorption and desorption of the gas molecules within the cabinet can be sufficiently performed, and consequently, a sufficient bass reproduction effect is attained. When the cumulative pore volume for the pores each having a radius ranging from 18 to 50 angstroms in the activated carbon is less than 0.4 ml/g, the decreased sound pressure level in the bass range cannot be sufficiently recovered in an atmosphere of high humidity.

In this case, the cumulative pore volume for the pores each having a radius of 18 angstroms or less in the above-described activated carbon is more preferably 0.2 ml/g or less and even more preferably 0.1 ml/g or less. When the cumulative pore volume for the pores each having a radius of 18 angstroms or less exceeds 0.2 ml/g, the amount of water adsorbed tends to be relatively large in a region at a humidity of about 50 to 70%, and so the sufficient bass reproduction effect in the above-described loudspeaker device may not be attained.

The pore radius and the cumulative pore volume in the activated carbon specified above are determined by a water vapor method, which will be described below. In this method, the fact that the equilibrium water vapor pressure of sulfuric acid aqueous solutions at a given concentration is a constant value, or in other words, the fact that there is a definite relationship between the sulfuric acid concentration and the equilibrium water vapor pressure in sulfuric acid aqueous solutions, is utilized to create a space at a predetermined water vapor pressure, and the determination is performed using this space. Specifically, the cumulative pore volume corresponding to a predetermined pore radius is obtained based on a curve showing a relationship between the pore size and the cumulative pore volume generated by the following method.

First, a predetermined weight of an activated carbon is placed in a gaseous phase portion of an adsorption chamber in which a sulfuric acid aqueous solution at a predetermined concentration is contained, and the activated carbon is brought into contact with water vapor under the conditions of 1 atmospheric pressure (absolute pressure) and 30° C. for 48 hours to reach equilibrium. Then, the weight of this activated carbon is determined, and the increment of the weight is used as the saturated amount of water adsorbed on the activated carbon at 30° C.

The above-described sulfuric acid aqueous solution used has an equilibrium water vapor pressure value (P) (a value at 1 atmospheric pressure (absolute pressure) and 30° C.) which is specific to the concentration thereof, and at that equilibrium water vapor pressure, water vapor is adsorbed on pores having a radius of not greater than a predetermined pore radius (r). The predetermined pore radius is calculated based on the Kelvin equation represented by formula (I) below. The cumulative pore volume for the pores each having not greater than the predetermined pore radius corresponds to a volume of water at 30° C. corresponding to the saturated amount of water adsorbed which is obtained by the determination described above.

$$r=-[2Vm\gamma\cos\Phi]/[RT\ln(P/P_0)] \quad (I)$$

where r, Vm, γ, Φ, R, T, P, and $P_0$ have the following meanings:

r: pore radius (cm)

Vm: molecular volume of water ($cm^3$/mol)=18.079 (30° C.)

γ: surface tension of water (dyne/cm)=71.15 (30° C.)

Φ: contact angle between capillary tube wall and water) (°)=55°

R: gas constant (erg/deg·mol)=$8.3143\times10^7$

T: absolute temperature (K)=303.15

P: saturated vapor pressure shown by water within pores (mmHg)

$P_0$: saturated vapor pressure of water at 1 atmospheric pressure (absolute pressure) and 30° C. (mmHg)=31.824

Figure 3:
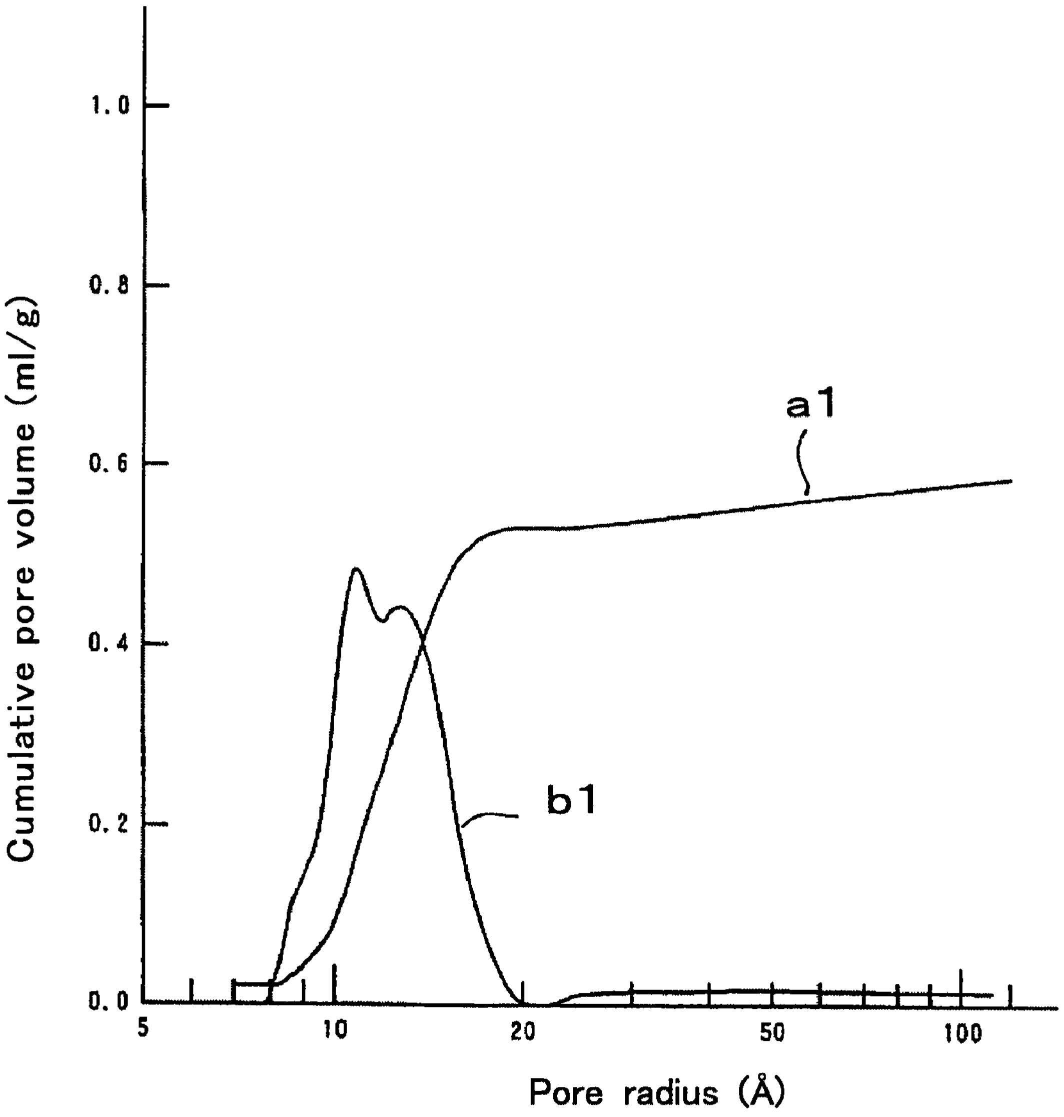
FIG. 3 is a graph showing the pore radius distribution and the cumulative pore volume relative to the pore radius of an activated carbon obtained in Example 1.

As the predetermined sulfuric acid aqueous solution described above, eleven types of sulfuric acid aqueous solutions having specific gravities from 1.05 to 1.30 at 0.025 intervals, a sulfuric acid aqueous solution having a specific gravity of 1.35, and a sulfuric acid aqueous solution having a specific gravity of 1.40 (a total of thirteen types of aqueous solutions of sulfuric acid) are prepared, and the determination described above is performed. In this manner, the cumulative pore volume for the pores each having not greater than a calculated pore radius is obtained in each determination. The thus obtained cumulative pore volumes are plotted against pore radius, and thus a cumulative pore volume curve in the activated carbon is obtained. A pore distribution curve is obtained by differentiating the cumulative pore volume curve. For example, FIG. 3 shows a graph showing the pore radius distribution and the cumulative pore volume relative to the pore radius of the activated carbon obtained in Example 1.

Based on the thus obtained cumulative pore volume curve of the activated carbon, the cumulative pore volume for a desired pore radius range in the activated carbon is obtained.

There is no particular limitation on the method for producing the activated carbon used as the sound pressure level improving material of the present invention, and an activated carbon having the above-described predetermined cumulative pore volume can be selected from activated carbons obtained by common methods for producing an activated carbon. Usually, the activated carbon used in the present invention is produced by sufficiently carbonizing a carbonaceous material and thereafter activating the carbonized material using a method such as gas activation or chemical activation.

Mineral materials, plant materials, synthetic materials, and the like are used as the above-described carbonaceous material. Examples of the mineral materials include coal and petroleum materials (such as coal pitch and coke). Examples of the plant materials include wood, charcoal, fruit shell (such as coconut shell), and various types of fibers. Among these, examples of the various types of fibers include natural fibers such as cotton and hemp, regenerated fibers such as rayon and viscose rayon, and semi-synthetic fibers such as acetate and triacetate. Examples of the synthetic materials include various types of synthetic resins, and examples of the synthetic resins include polyamide resins such as nylon, polyvinyl alcohol resins such as vinylon, acrylic resins, polyacrylonitrile resins, polyolefin resins such as polyethylene and polypropylene, polyurethane resins, phenolic resins, and vinyl chloride resins.

Among the carbonaceous materials, particularly the plant materials and the synthetic materials are preferable. For example, coconut shell, phenolic resins, and the like are preferably used. The carbonaceous materials may be used alone, or may be used in combination of two or more.

There is no particular limitation on the form of the carbonaceous material. Materials in various forms such as granular, powder, fibrous, and sheet-like forms can be used. In view of the ease of handling and in order for the material to effectively exhibit the performance, a carbonaceous material in granular form is preferably used in relatively large loudspeaker devices, and a carbonaceous material in fibrous or sheet-like form is preferably used in small and thin loudspeaker devices. The material in granular form may have been crushed or may be a granulated product. Examples of carbonaceous materials in fibrous and sheet-like forms include sheet products such as woven fabric, nonwoven fabric, film, felt, paper, and molded plates.

There is no particular limitation on the conditions under which the carbonization of the carbonaceous material is performed. In the case of, for example, a carbonaceous material in granular form, conditions such as that the carbonaceous material is treated in a batch-type rotary kiln at a temperature of 300° C. or higher while flowing a small amount of inert gas into the kiln can be employed.

As described above, any method, such as gas activation and chemical activation, may be employed as the method for activation after the carbonization of the carbonaceous material. Preferably, gas activation is employed in that an activated carbon having a high mechanical strength and having the above-described predetermined pore size is obtained. Examples of gases used in the gas activation include water vapor, carbon dioxide gas, oxygen, LPG exhaust gas, or a mixed gas of these gases. In view of the safety and the reactivity, a water vapor-containing gas (a gas containing 10 to 50 vol % of water vapor) is preferable.

The activation temperature is usually 700° C. to 1100° C. and preferably 800° C. to 1000° C. However, there is no particular limitation on the activation temperature, the activation time, and the rate of temperature increase, and these conditions vary depending on the type, form, size and desired pore size distribution of the selected carbonaceous material. Although the activated carbon obtained by the activation can be used as it is, in practical use, it is preferable to remove the deposits by acid washing, water washing, or the like.

The thus obtained activated carbon can be in particulate form, sheet-like form, or the like depending on the form of the above-described carbonaceous material. Alternatively, the activated carbon may also be further ground. Activated carbons having a desired particle size ranging from granular particles having a certain degree of size to fine powder can be used as the activated carbon in particulate form as required. The activated carbon in sheet-like form can be in fabric form, felt form, paper form, plate form, or the like. Moreover, such activated carbons may be used alone, or may be used in combination of two or more.

The particulate activated carbon usually has a particle size of 0.05 to 1.0 mm and preferably 0.1 to 0.3 mm. In the case where the activated carbon is in fabric form, the thickness thereof is usually 0.1 to 2.0 mm and preferably 0.3 to 1.0 mm. An activated carbon fabric having a thickness of less than 0.1 mm is difficult to handle because of its low strength, and an activated carbon fabric having a thickness of more than 2.0 mm is difficult to produce. In the case where the activated carbon is in felt form, paper form, or plate form, the thickness thereof is usually 0.1 to 10.0 mm and preferably 0.3 to 5.0 mm. When an activated carbon in any form having the above-described size is used in a loudspeaker device, a particularly preferable bass reproduction effect is attained.

(B) Loudspeaker Device

An embodiment of the loudspeaker device of the present invention is illustrated in FIG. 1 and will be described with reference to FIG. 1. A loudspeaker device 1 of the present invention has a cabinet 10, a loudspeaker unit 11 attached to the cabinet 10, and a sound pressure level improving material 12 disposed in an empty chamber R1 in the interior of the cabinet 10. The sound pressure level improving material 12 is composed of an activated carbon having the above-described predetermined cumulative pore volume. In the case where the sound pressure level improving material 12 is in fibrous form or in sheet-like form, the sound pressure level improving material 12 can be disposed in an appropriate position in the empty chamber R1 within the cabinet 10 as it is. In the case where the sound pressure level improving material 12 is composed of a granular or powder activated carbon, it is preferable that the sound pressure level improving material 12 is wrapped in a wrapping material, such as a woven fabric or a nonwoven fabric, having air permeability and then disposed in the cabinet 10. The amount of the sound pressure level improving material 12 varies depending on the capacity of the cabinet 10, the form of the sound pressure level improving material 12, and so on, and is not particularly limited.

The empty chamber R1 is usually filled with air at normal pressure, but may also be charged with a specific gas such as carbon dioxide.

In FIG. 1, when an electric signal is applied to the loudspeaker unit 11, a force is generated in a voice coil and vibrates a cone diaphragm to produce sound. The sound pressure generated by the cone diaphragm increases the internal pressure of the empty chamber R1. However, since the sound pressure level improving material 12 composed of the activated carbon is disposed in the empty chamber R1, pressure fluctuations in the empty chamber R1 are suppressed by adsorption and desorption of a gas onto and from the sound pressure level improving material 12, and the volume of the empty chamber R1 equivalently increases. In other words, the above-described loudspeaker device 1 operates as if the loudspeaker unit were attached to a cabinet having a large volume.

Since the above-described sound pressure level improving material 12 has the above-described predetermined cumulative pore volume, the equivalent volume of the cabinet 10 is larger than that in the case where an ordinary activated carbon is used. The theoretical enlargement factor of the equivalent volume of the cabinet 10 can be expressed by a formula below as the "volume enlargement factor".

When the resonance frequency of the loudspeaker unit 11 used is taken as $f_0$, $f_0$ is expressed by formula (1) below:

$$f_0 = \frac{1}{2\pi}\sqrt{\frac{1}{M_{ms}C_{ms}}} \tag{1}$$

where $M_{ms}$ represents the weight of a loudspeaker vibration system, and $C_{ms}$ represents the compliance of a loudspeaker support system.

When the resonance frequency when this loudspeaker unit 11 is attached to the cabinet 10 is taken as $f_{0B}$, $f_{0B}$ is expressed by formula (2) below:

$$f_{0B} = \frac{1}{2\pi}\sqrt{\frac{1}{M_{ms}\left(\frac{C_{ms}C_{mA}}{C_{ms}+C_{mA}}\right)}} \tag{2}$$

where $C_{mA}$ represents the air compliance of the cabinet's capacity.

When the material 12 for improving the sound pressure level at the bass reproduction limit is disposed in the interior of this cabinet 10 and the equivalent capacity of the cabinet 10 is enlarged by a factor of A and when the resonance frequency at this time is taken as $f_{0C}$, $f_{0C}$ is expressed by formula (3) below:

$$f_{0C} = \frac{1}{2\pi}\sqrt{\frac{1}{M_{ms}\left(\frac{C_{ms}A\cdot C_{mA}}{C_{ms}+A\cdot C_{mA}}\right)}} \tag{3}$$

From formulae (1), (2), and (3) above, the volume enlargement factor A is expressed by formula (4) below:

$$A = \frac{\left(\frac{f_{0C}}{f_0}\right)^2 - 1}{\left(\frac{f_{0B}}{f_0}\right)^2 - 1} \quad (4)$$

In the present invention, the above-described volume enlargement factor of the loudspeaker device 1 varies depending on the type and amount of the sound pressure level improving material 12 used, the capacity of the cabinet 10, and so on, but in any case, a higher effect is attained than in the case where a conventional activated carbon in a loudspeaker device is used.

Figure 2:
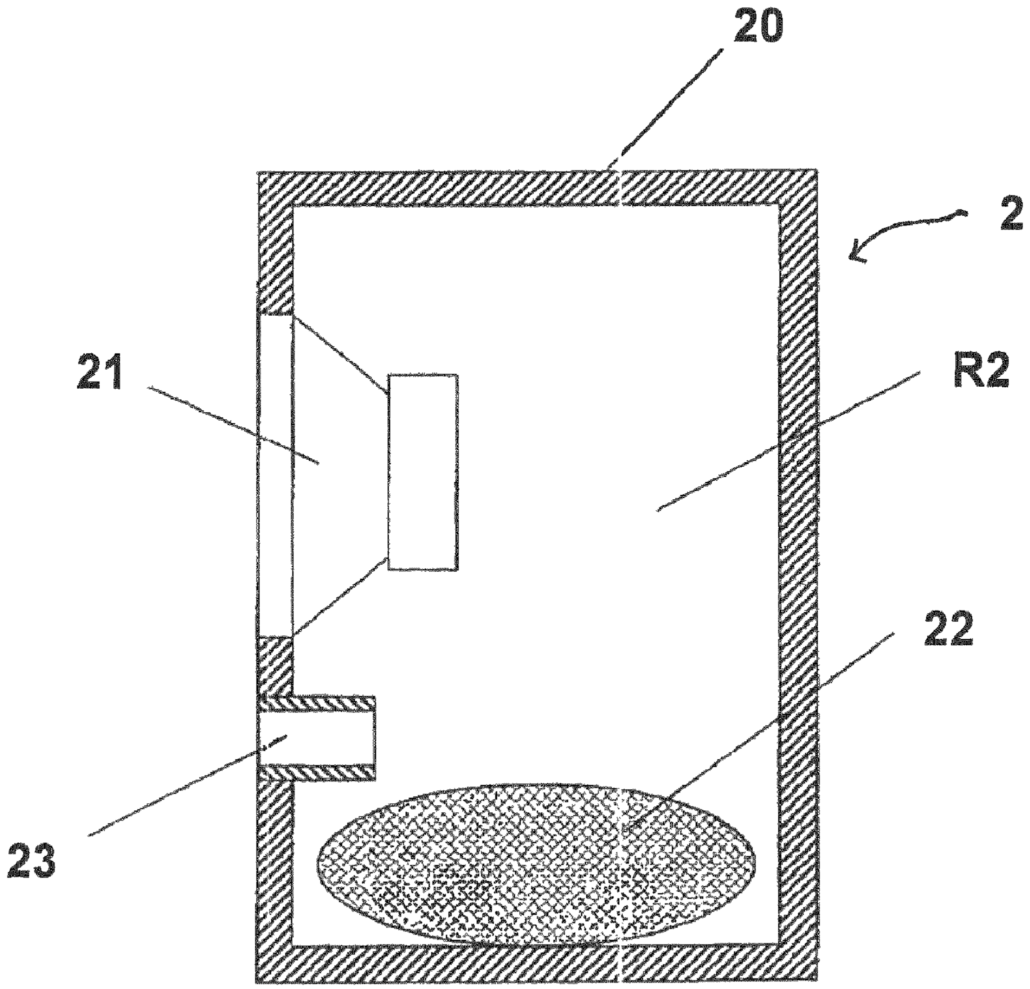
FIG. 2 is a schematic cross-sectional view showing another embodiment of the loudspeaker device using the material for improving the sound pressure level at the bass reproduction limit of the present invention.

Another embodiment of the loudspeaker device of the present invention is illustrated in FIG. 2 and will be described with reference to FIG. 2. A loudspeaker device 2 of the present invention has a cabinet 20, a loudspeaker unit 21 attached to the cabinet 20, and a sound pressure level improving material 22 disposed in an empty chamber R2 in the interior of the cabinet 20. The loudspeaker device 2 is a bass-reflex loudspeaker device having a bass-reflex port 23 in the cabinet 20. There is no particular limitation on the type of the loudspeaker device 2 of the present invention, and the loudspeaker device 2 may also be a sealed loudspeaker device.

The above-described sound pressure level improving material 22 is composed of an activated carbon having the above-described predetermined cumulative pore volume, preferably an activated carbon having a cumulative pore volume of 0.4 ml/g or more for the pore each having a radius ranging from 18 to 50 angstroms. In the case where the sound pressure level improving material 22 is in fibrous form or in sheet-like form, the sound pressure level improving material 22 can be disposed in an appropriate position in the empty chamber R2 within the cabinet 20 as it is. In the case where the sound pressure level improving material 22 is an activated carbon in granular form or in powder form, it is preferable that the sound pressure level improving material 22 is wrapped in a wrapping material, such as a woven fabric or a nonwoven fabric, having air permeability and then disposed in the cabinet 20. The amount of the sound pressure level improving material 22 varies depending on the capacity of the cabinet 20, the form of the sound pressure level improving material 22, and so on, and is not particularly limited.

The loudspeaker device 2 in FIG. 2 is a bass-reflex loudspeaker device having the bass-reflex port (acoustic port) 23 in the cabinet 20. A bass-reflex system aims to increase the sound pressure in a low frequency region by acoustically resonating the sound radiated to the rear of the loudspeaker unit 21 with a volume portion of the empty chamber R2 and releasing the resonated sound, by adjusting the size and length of the opening of the bass-reflex port 23. Since the bass-reflex port 23 permits flow of air into and out of the cabinet 20, when the humidity of the outside air is high, the humidity within the cabinet 20 also increases. For example, in the case where the sound pressure level improving material 22 is an activated carbon having a cumulative pore volume of 0.4 ml/g or more for the pores each having a radius of 18 to 50 angstroms, the sound pressure level improving material 22 is sufficiently resistant to moisture. Thus, even when the loudspeaker device 2 is used in an atmosphere of high humidity, the activated carbon is unlikely to adsorb moisture.

In FIG. 2, when an electric signal is applied to the loudspeaker unit 21, a force is generated in a voice coil and vibrates a cone diaphragm to produce sound. The sound pressure generated by the cone diaphragm increases the internal pressure of the empty chamber R2. However, since the sound pressure level improving material 22 composed of the activated carbon that is resistant to moisture is disposed in the empty chamber R2, adsorption and desorption of a gas onto and from this activated carbon is effectively performed even under high humidity conditions. As a result, pressure fluctuations in the empty chamber R2 are suppressed, and the volume of the empty chamber R2 equivalently increases. Therefore, even under high humidity conditions, a sufficient bass reproduction effect is attained, and so an acoustic effect equal to that in the case where a cabinet having a large capacity is used is attained.

EXAMPLES

Example 1

A coconut shell was carbonized, and then activated with a water vapor-containing combustion gas at 850° C. to obtain a granular activated carbon having an average particle size of 0.35 mm. FIG. 3 shows a cumulative pore volume curve of this activated carbon in conjunction with a pore distribution curve thereof. In FIG. 3, a1 is the cumulative pore volume curve, and b1 is the pore distribution curve. Values of the cumulative pore volume curve a1 on the vertical axis represent the cumulative pore volume (ml/g) per g of the activated carbon. The vertical axis of the pore distribution curve b1 shows relative values. This activated carbon had a cumulative pore volume of 0.52 ml/g for the pores each having a radius of 18 angstroms or less and a cumulative pore volume of 0.03 ml/g for the pores each having a radius of 18 to 50 angstroms.

Figure 4:
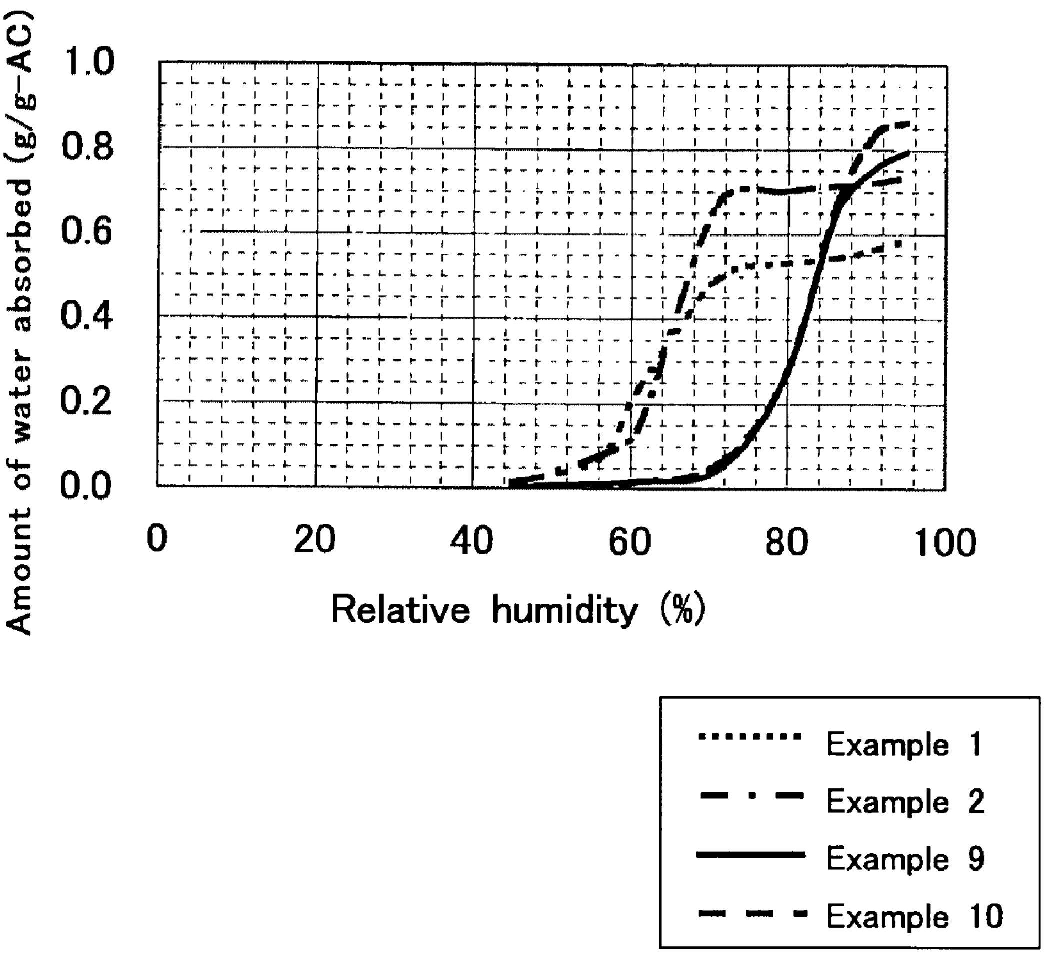
FIG. 4 is a graph showing the amount of water adsorbed with respect to the relative humidity for activated carbons obtained in Examples 1, 2, 9, and 10.

FIG. 4 shows a graph showing the amount of water adsorbed (g) per g of this activated carbon with respect to the relative humidity. This graph is a graph generated in the above-described water vapor method from relative humidities calculated from water vapor pressures corresponding to respective sulfuric acid concentrations and the amounts of water adsorbed corresponding to the calculated relative humidities. In FIG. 4, the unit (g/g-AC) of the vertical axis means the amount of water adsorbed per g of the activated carbon.

Example 2

A phenol resin fiber was carbonized, and then activated with a water vapor-containing combustion gas at 850° C. to obtain a cloth-like activated carbon having an average thickness of 0.50 mm. This activated carbon had a cumulative pore volume of 0.72 ml/g for the pores each having a radius of 18 angstroms or less and a cumulative pore volume of 0.00 ml/g for the pores each having a radius of 18 to 50 angstroms. A graph of the amount of water adsorbed for this activated carbon similar to that in Example 1 is shown in FIG. 4.

Example 3

A coconut shell was carbonized, and then activated with a water vapor-containing combustion gas at 860° C. to obtain a granular activated carbon having an average particle size of 0.30 mm. This activated carbon had a cumulative pore volume of 0.53 ml/g for the pores each having a radius of 18 angstroms or less.

Comparative Example 1

A coal was granulated, then activated with a water vapor-containing combustion gas at 900° C. and thereafter ground to obtain a granular activated carbon having an average particle size of 0.28 mm. This activated carbon had a cumulative pore volume of 0.35 ml/g for the pores each having a radius of 50 angstroms or less and a cumulative pore volume of 0.20 ml/g for the pores each having a radius of 18 angstroms or less.

Example 4

Figure 5:
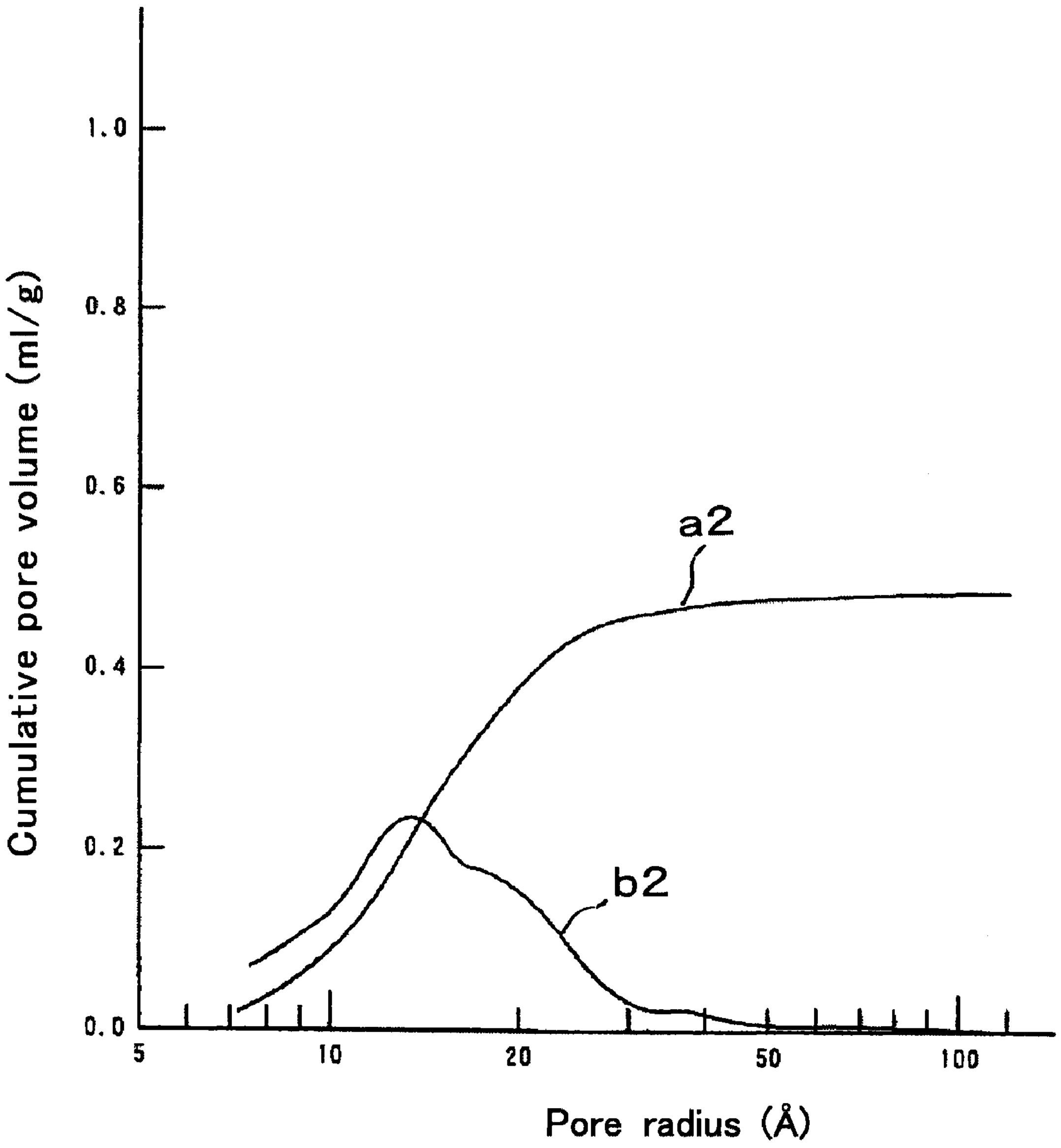
FIG. 5 is a graph showing the pore radius distribution and the cumulative pore volume relative to the pore radius of an activated carbon obtained in Example 4.

A coal was granulated, then activated with a water vapor-containing combustion gas at 880° C. and thereafter ground to obtain a granular activated carbon having an average particle size of 0.27 mm. FIG. 5 shows a cumulative pore volume curve a2 of this activated carbon in conjunction with a pore distribution curve b2 thereof. This activated carbon had a cumulative pore volume of 0.47 ml/g for the pores each having a radius of 50 angstroms or less and a cumulative pore volume of 0.33 ml/g for the pores each having a radius of 18 angstroms or less.

Example 5

A loudspeaker device as shown in FIG. 1 was prepared. This loudspeaker device was a sealed loudspeaker device in which a loudspeaker unit 11 having an aperture of 8 cm was attached to a cabinet 10 having an internal volume of 0.5 L. The resonance frequency of this loudspeaker unit was 76 Hz. Then, 40 g of the activated carbon obtained in Example 1 was wrapped in an air permeable woven fabric and installed in an empty chamber R1 of this loudspeaker device as the material 12 for improving the sound pressure level at the bass reproduction limit.

A sinusoidal electrical input of 1 W was applied to this loudspeaker unit, and the sound pressure was measured by disposing a measuring microphone in a position at a distance of 1 m from the loudspeaker device. The impedance of the loudspeaker device was also measured. A loudspeaker device in which no activated carbon was installed also underwent the same measurement as a control.

Figure 6:
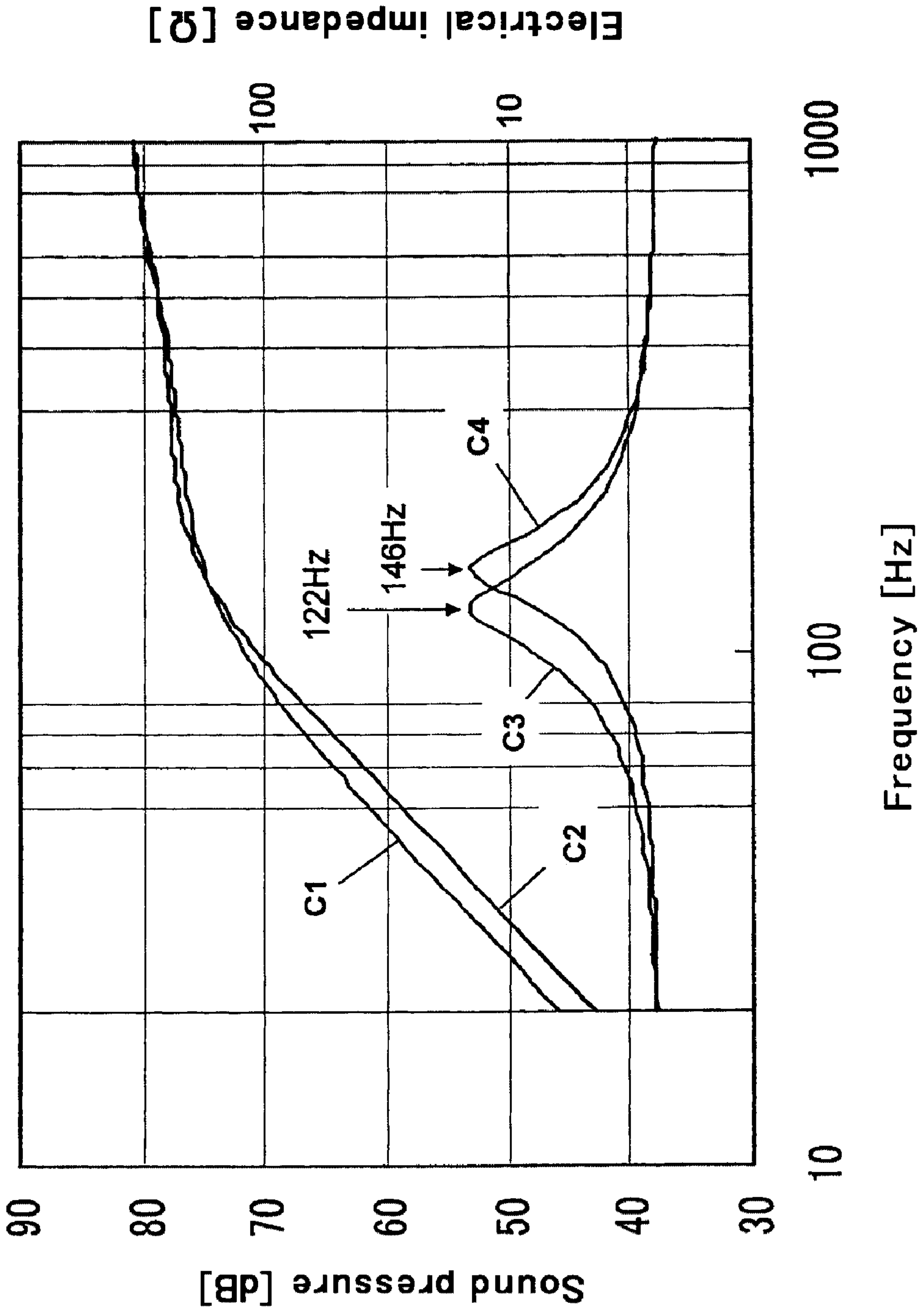
FIG. 6 is a graph showing curves that represent the sound pressure characteristics of a loudspeaker device produced in Example 5 and a control loudspeaker device and showing the electrical impedance characteristics of these systems.

A curve C1 in FIG. 6 is a curve (frequency response curve) representing the sound pressure characteristics of the loudspeaker device of this example, and a curve C2 is a frequency response curve of the control loudspeaker device. The vertical axis shows the sound pressure (dB), and values of the sound pressure are shown at the left end of the graph. The curve C1 shows a higher sound pressure level in a low frequency region from 20 to 100 Hz than the curve C2, which indicates that bass sound is reproduced well.

A curve C3 in FIG. 6 is an electrical impedance curve of the loudspeaker device of this example, which shows changes in the electrical impedance associated with changes in the frequency. Similarly, a curve C4 is an electrical impedance curve of the above-described control loudspeaker device. The vertical axis shows the electrical impedance (Ω), and values of the electrical impedance are shown at the right end of the graph. A peak around 100 Hz to 200 Hz represents the resonance frequency ($f_0$) of the loudspeaker. The more this peak is shifted toward lower frequencies, the better the bass reproduction.

The resonance frequency ($f_0$) of the loudspeaker unit used is 76 Hz, and as shown in FIG. 6, the resonance frequency $f_{0B}$ when this loudspeaker unit is attached to the cabinet (in the case where no activated carbon is disposed therein) is 146 Hz, and the resonance frequency $f_{0C}$ when the activated carbon is disposed in the interior of the cabinet is 122 Hz. Therefore, from formula (4) above, it is found that the volume enlargement factor of this loudspeaker device is 1.71.

Examples 6 and 7

The same test as in Example 5 was performed using the activated carbons obtained in Examples 2 and 3 to calculate the volume enlargement factor. The volume enlargement factors of the activated carbons obtained in Examples 2 and 3 were 2.16 and 1.33, respectively.

Example 8

The same test as in Example 5 was performed except that the activated carbon obtained in Example 4 was used in the same system as in Example 5 instead of the activated carbon obtained in Example 1.

Figure 7:
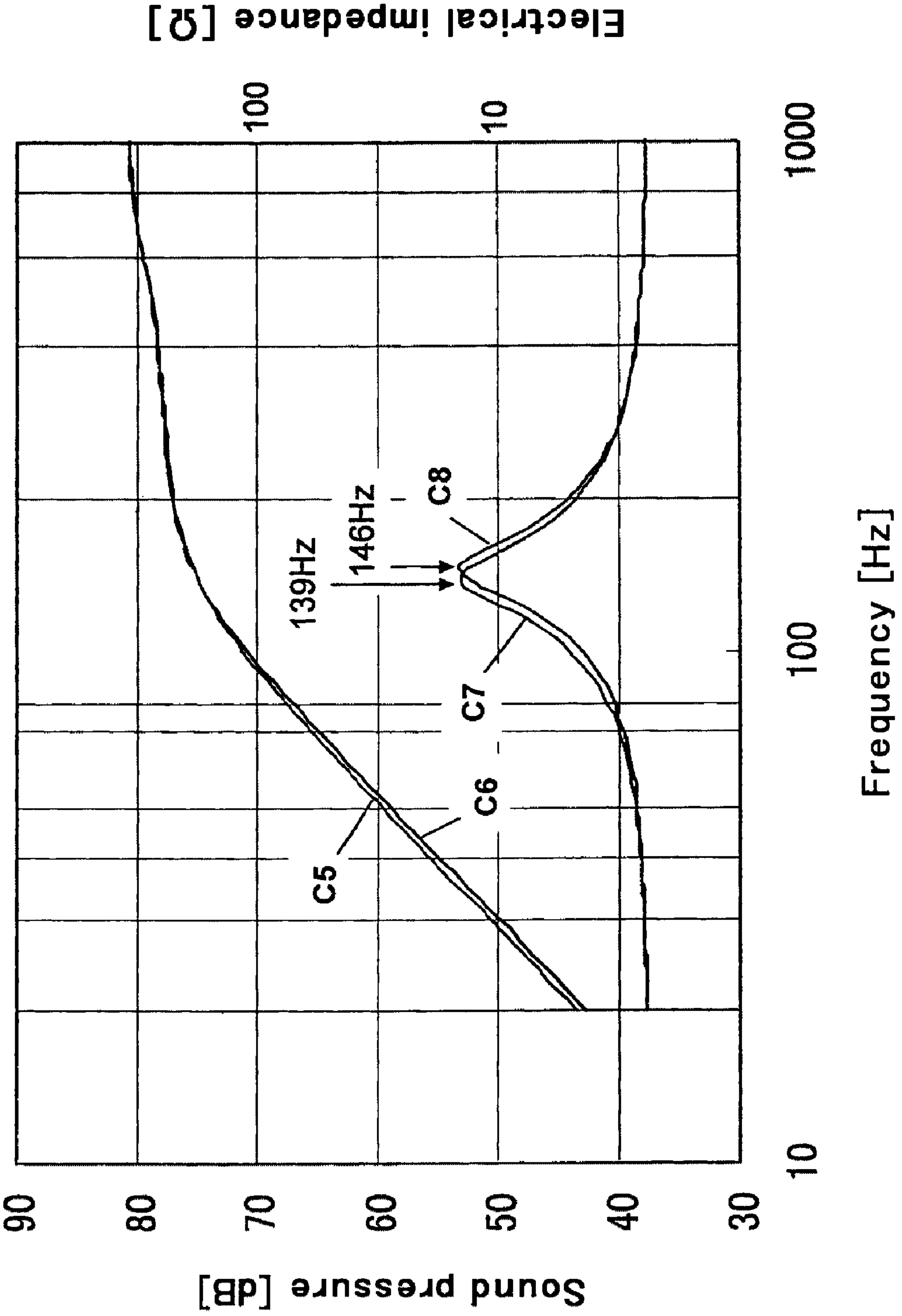
FIG. 7 is a graph showing curves that represent the sound pressure characteristics of a loudspeaker device produced in Example 8 and a control loudspeaker device and showing the electrical impedance characteristics of these systems.

A curve C5 in FIG. 7 is a frequency response curve of the loudspeaker device of this example, and a curve C6 is a frequency response curve of a control loudspeaker device. The unit of the vertical axis is the same as that in Example 5. The curve C5 shows a slightly higher sound pressure level in the low frequency region from 20 to 100 Hz than the curve C6.

A curve C7 in FIG. 7 is an electrical impedance curve of the loudspeaker device of this example, and a curve C8 is an electrical impedance curve of the above-described control loudspeaker device. The unit of the vertical axis is the same as that in Example 5. A peak around 100 Hz to 200 Hz represents the resonance frequency ($f_0$) of the loudspeaker. The volume enlargement factor of the loudspeaker device was calculated in the same manner as in Example 5 and was found to be 1.13.

Comparative Example 2

The same test as in Example 5 was performed using the activated carbon obtained in Comparative Example 1 to calculate the volume enlargement factor. As a result, the volume enlargement factor was found to be 0.97.

Example 9

Figure 8:
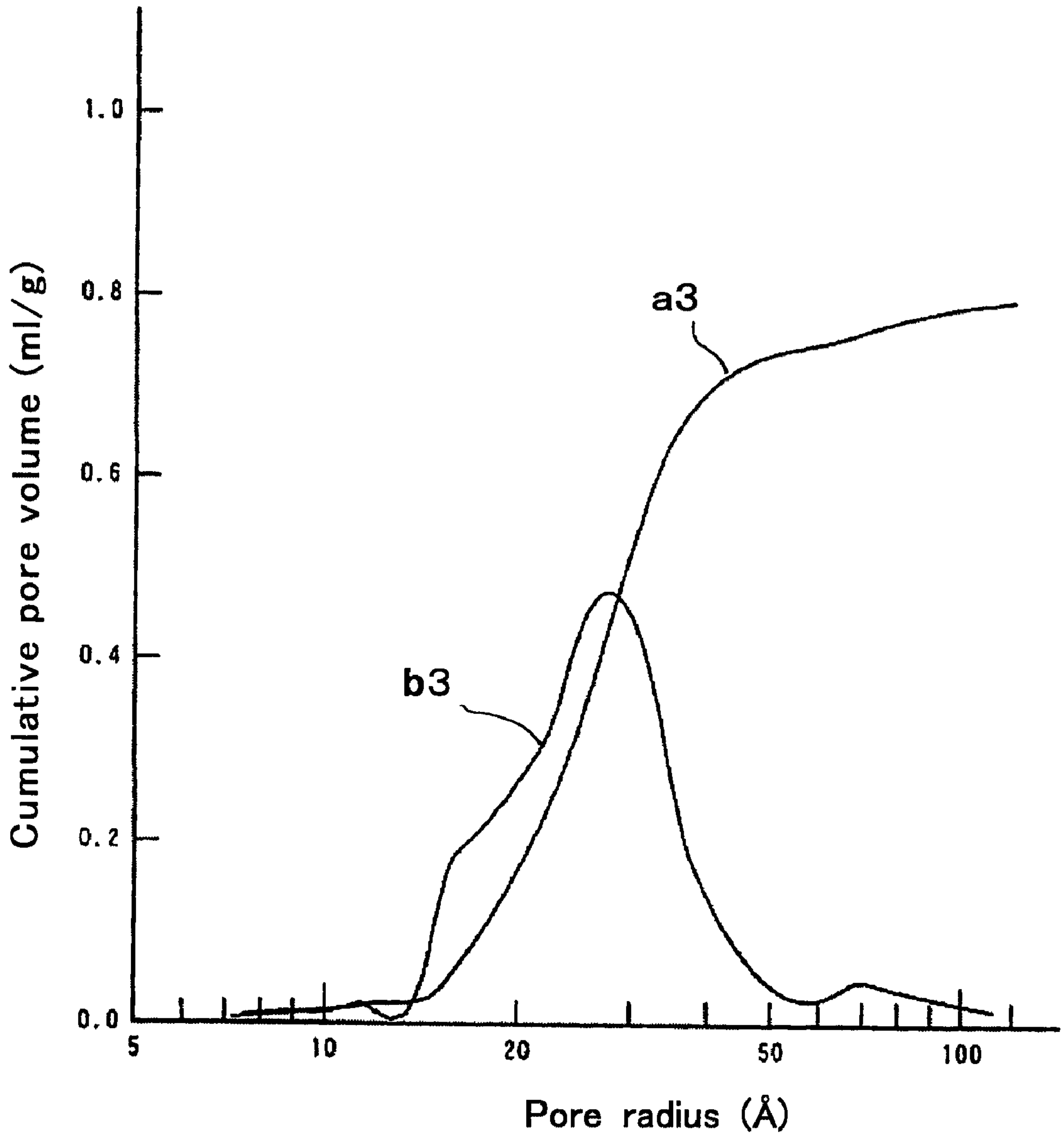
FIG. 8 is a graph showing the pore radius distribution and the cumulative pore volume relative to the pore radius of the activated carbon obtained in Example 9.

A coal was granulated, then activated with a water vapor-containing combustion gas at 880° C. and thereafter ground to obtain a granular activated carbon having an average particle size of 0.35 mm. FIG. 8 shows a cumulative pore volume curve of this activated carbon in conjunction with a pore distribution curve thereof. In FIG. 8, a3 is the cumulative pore volume curve, and b3 is the pore distribution curve. This activated carbon had a cumulative pore volume of 0.62 ml/g for the pores each having a radius of 18 to 50 angstroms. A graph of the amount of water adsorbed for this activated carbon similar to that in Example 1 is also shown in FIG. 4.

Example 10

A coal was granulated, and then activated with a water vapor-containing combustion gas at 900° C. to obtain a granular activated carbon having an average particle size of 0.32 mm. This activated carbon had a cumulative pore volume of 0.71 ml/g for the pores each having a radius of 18 to 50 angstroms. A graph of the amount of water adsorbed for this activated carbon similar to that in Example 1 is also shown in FIG. 4.

Example 11

A loudspeaker device as shown in FIG. 2 was prepared. This loudspeaker device was a bass-reflex loudspeaker device in which a cone loudspeaker unit 21 having an aperture of 8 cm was attached to a cabinet 20 that had an internal volume of 0.8 L and was provided with a bass-reflex port 23. Then, 40 g of the activated carbon obtained in Example 9 was wrapped in an air permeable woven fabric and installed in an empty chamber R2 of this loudspeaker device as the material 22 for improving the sound pressure level at the bass reproduction limit.

A sinusoidal electrical input of 1 W was applied to this loudspeaker unit, and the sound pressure was measured by disposing a measuring microphone in a position at a distance of 1 m from the loudspeaker device. A loudspeaker device in which no activated carbon is installed also underwent the same measurement as a control.

Then, this loudspeaker device having the activated carbon was left in an atmosphere of a humidity of 70% for 24 hours. Thereafter, the sound pressure of the loudspeaker device having the activated carbon was measured in the same manner as described above.

Figure 9:
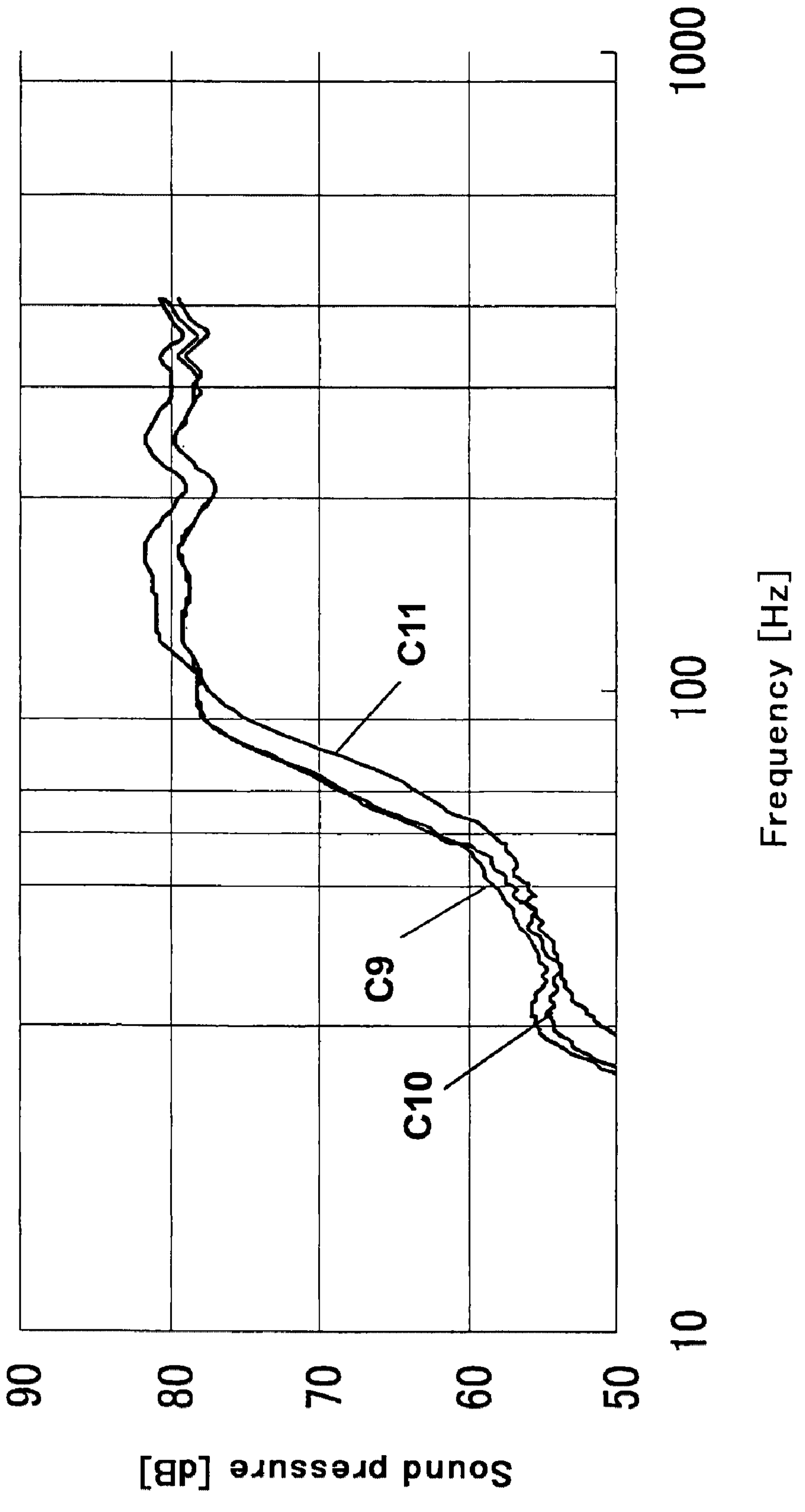
FIG. 9 is a graph showing curves representing the sound pressure characteristics of a loudspeaker device produced in Example 11 and the loudspeaker device after being left under high humidity conditions.

A curve C9 in FIG. 9 is a curve (frequency response curve) showing the sound pressure characteristics of the loudspeaker device as originally produced in this example, and a curve C10 is a frequency response curve of the loudspeaker device after being left in the atmosphere of a humidity of 70% for 24 hours. A curve C11 is a frequency response curve of the control loudspeaker device. The curve C9 shows a higher sound pressure level in a low frequency region from 30 to 100 Hz than the curve C11, which indicates that bass sound is reproduced well. Furthermore, the curve C10, which shows the sound pressure characteristics of the loudspeaker device after being left in the atmosphere of a humidity of 70%, is almost equal to the curve C9, which indicates that a sufficiently high sound pressure level is attained in the bass range even under high humidity conditions.

Example 12

The same test as in Example 11 was performed except that the activated carbon obtained in Example 1 was used in the same system as in Example 11 instead of the activated carbon obtained in Example 9.

Figure 10:
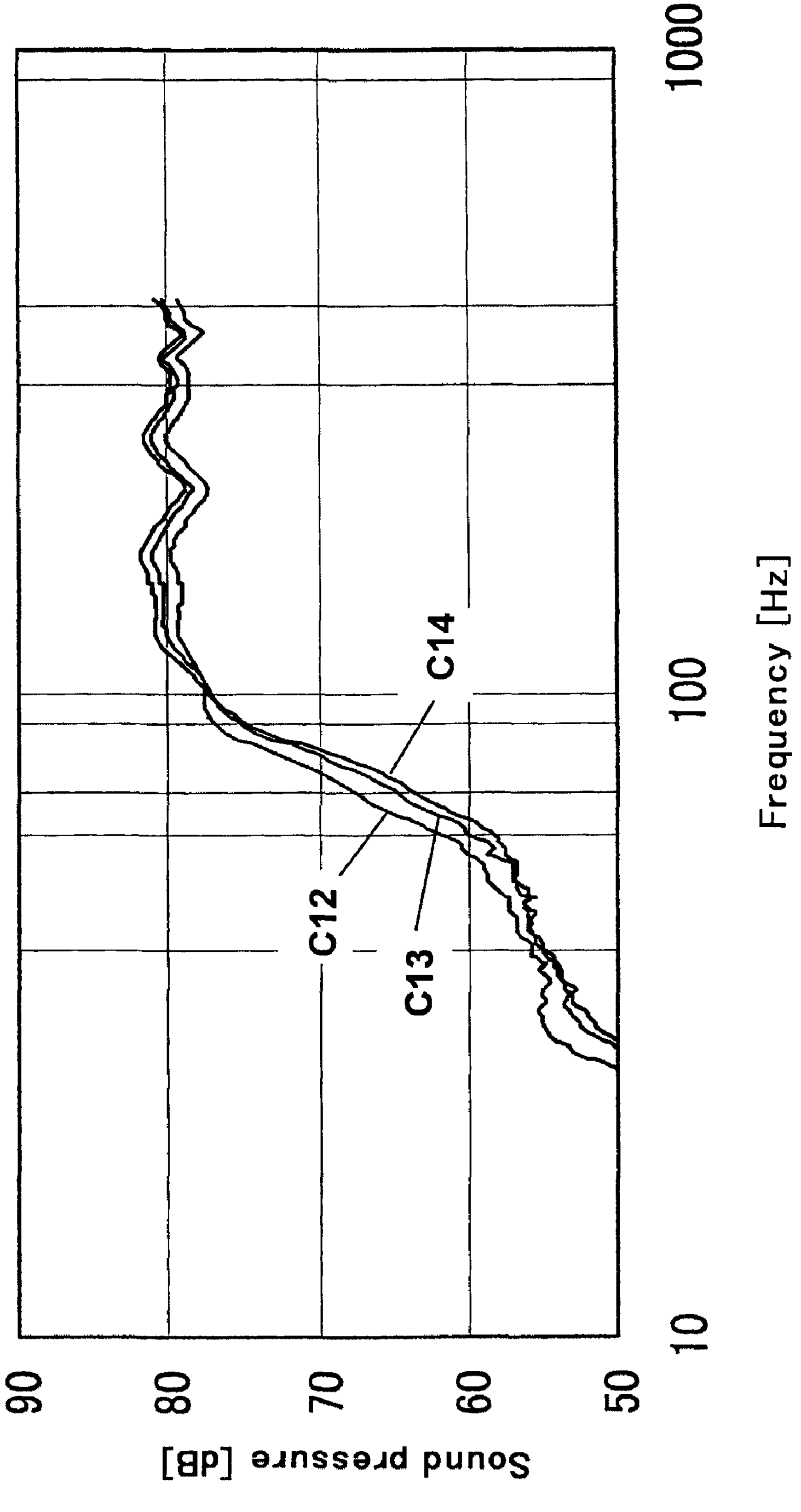
FIG. 10 is a graph showing curves representing the sound pressure characteristics of a loudspeaker device produced in Example 12 and the loudspeaker device after being left under high humidity conditions.

A curve C12 in FIG. 10 is a frequency response curve of the loudspeaker device as originally produced in this example, and a curve C13 is a frequency response curve of the loudspeaker device after being left in an atmosphere of a humidity of 70% for 24 hours. A curve C14 is a frequency response curve of a control loudspeaker device. The curve C12 shows a higher sound pressure level in the low frequency region from 30 to 100 Hz than the curve C14, which indicates that bass sound is reproduced well. However, a portion of the curve C13, which shows the sound pressure characteristics of the loudspeaker device after being left in the atmosphere of a humidity of 70%, in the low frequency region approximates the curve C14 of the control. Therefore, it is clear that a high sound pressure level cannot be attained in the bass range under high humidity conditions.

INDUSTRIAL APPLICABILITY

When the sound pressure level improving material of the present invention is installed in a cabinet of a loudspeaker device, the sound pressure level improving material alleviates pressure fluctuations of a gas within the cabinet caused by vibration of a loudspeaker, and thus a good bass reproduction effect is attained. In particular, when a sound pressure level improving material in which the activated carbon has a cumulative pore volume of 0.5 ml/g or more for the pores each having a radius of 18 angstroms or less is installed in the cabinet of the loudspeaker device, an acoustic effect equal to that in the case where a cabinet having a large capacity is used is attained. On the other hand, a sound pressure level improving material in which the activated carbon has a cumulative pore volume of 0.4 ml/g or more for the pores each having a radius of 18 to 50 angstroms is unlikely to adsorb moisture even in an atmosphere of relatively high humidity. Thus, when this sound pressure level improving material is installed in the cabinet of the loudspeaker device, the material can easily adsorb and desorb the gas within the cabinet even in an atmosphere of relatively high humidity, and as a result, a sufficient bass reproduction effect is attained even in an atmosphere of high humidity. The sound pressure level improving material of the present invention can be advantageously used in loudspeaker devices of both sealed and bass-reflex systems, and a loudspeaker device having a good bass reproduction effect is obtained.

The invention claimed is:

1. A material for improving the sound pressure level at the bass reproduction limit, comprising:

an activated carbon, wherein a cumulative pore volume for pores each having a radius of 50 angstroms or less of the activated carbon is 0.4 ml/g or more, and a cumulative pore volume for pores each having a radius of 7 angstroms or less of the activated carbon is 0.1 ml/g or less.

2. The material for improving the sound pressure level of claim 1, wherein a cumulative pore volume for pores having a radius of 18 angstroms or less of the activated carbon is 0.5 ml/g or more.

3. The material for improving the sound pressure level of claim 1, wherein a cumulative pore volume for pores having a radius from 18 to 50 angstroms of the activated carbon is 0.4 ml/g or more.

4. The material for improving the sound pressure level of claim 3, wherein the cumulative pore volume for pores having a radius from 18 to 50 angstroms is 0.5 ml/g or more.

5. A loudspeaker device comprising a cabinet, a loudspeaker unit attached to the cabinet, and a material for improving the sound pressure level at the bass reproduction limit disposed in an empty chamber in the interior of the cabinet, wherein the material for improving the sound pressure level comprises an activated carbon, a cumulative pore volume for pores each having a radius of 50 angstroms or less of the activated carbon is 0.4 ml/g or more, and a cumulative pore volume for pores each having a radius of 7 angstroms or less of the activated carbon is 0.1 ml/g or less.

6. The loudspeaker device of claim 5, wherein a cumulative pore volume for pores having a radius of 18 angstroms or less of the activated carbon is 0.5 ml/g or more.

7. The loudspeaker device of claim 5, wherein a cumulative pore volume for pores having a radius from 18 to 50 angstroms of the activated carbon is 0.4 ml/g or more.

8. The loudspeaker device of claim 7, wherein the cumulative pore volume for pores having a radius from 18 to 50 angstroms is 0.5 ml/g or more.

* * * * *